No. 718,813. PATENTED JAN. 20, 1903.
L. B. BARON.
CIGARETTE MAKING MACHINE.
APPLICATION FILED MAR. 21, 1902.
NO MODEL. 7 SHEETS—SHEET 1.

WITNESSES. INVENTOR.
L. B. Baron
by Wilkinson & Fisher,
ATTYS.

No. 718,813. PATENTED JAN. 20, 1903.
L. B. BARON.
CIGARETTE MAKING MACHINE.
APPLICATION FILED MAR. 21, 1902.
NO MODEL. 7 SHEETS—SHEET 4.

WITNESSES.
INVENTOR.
L. B. Baron.
by Wilkinson & Fisher
ATTYS.

No. 718,813. PATENTED JAN. 20, 1903.
L. B. BARON.
CIGARETTE MAKING MACHINE.
APPLICATION FILED MAR. 21, 1902.
NO MODEL. 7 SHEETS—SHEET 5.

WITNESSES. INVENTOR.
L. B. Baron.
by Wilkinson & Fisher
ATTYS.

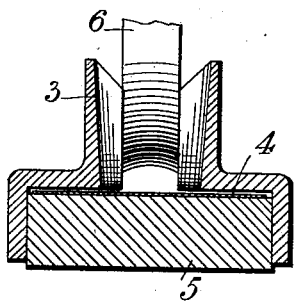
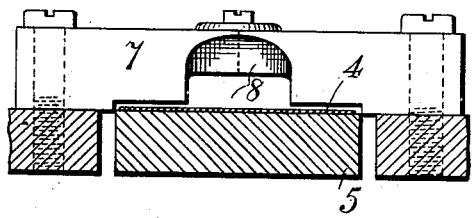
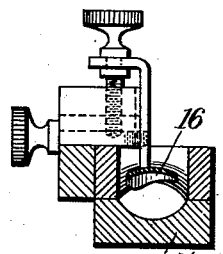
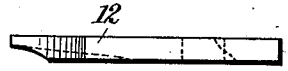
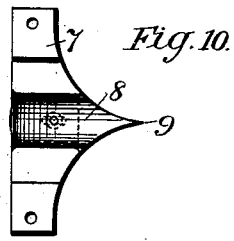
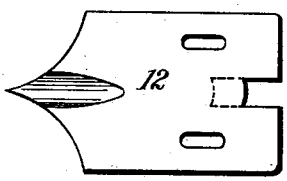

No. 718,813.
PATENTED JAN. 20, 1903.
L. B. BARON.
CIGARETTE MAKING MACHINE.
APPLICATION FILED MAR. 21, 1902.
NO MODEL.
7 SHEETS—SHEET 7.
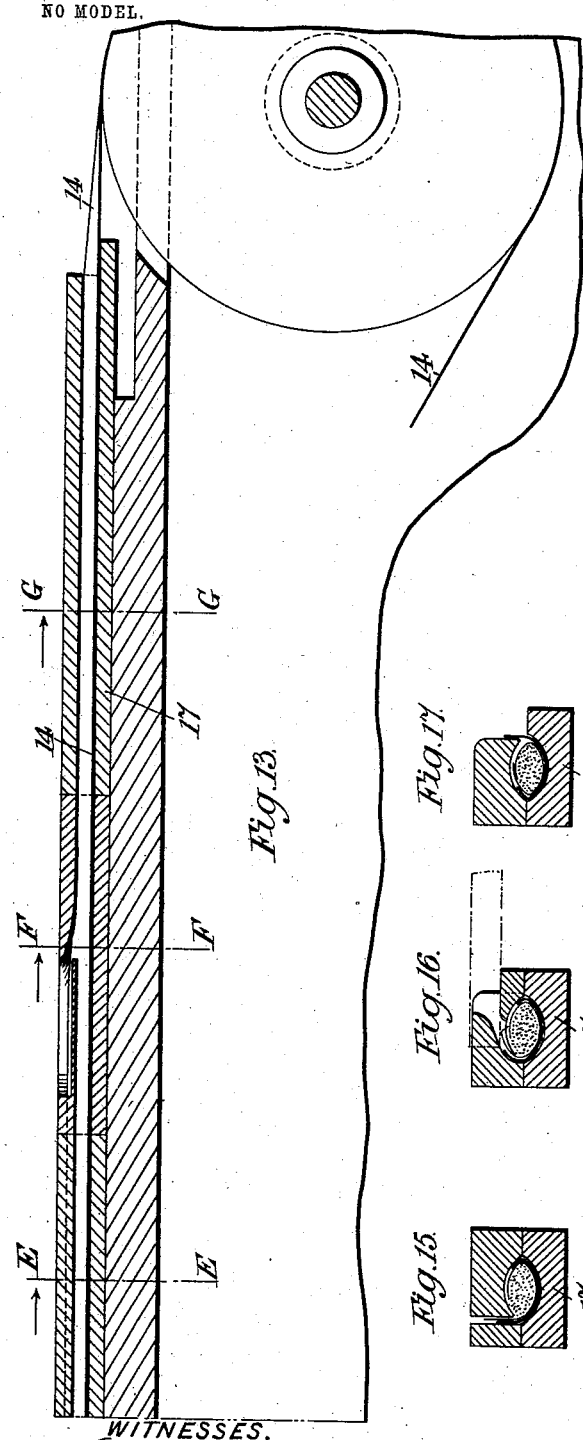
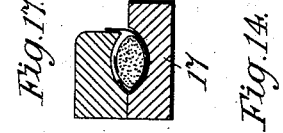
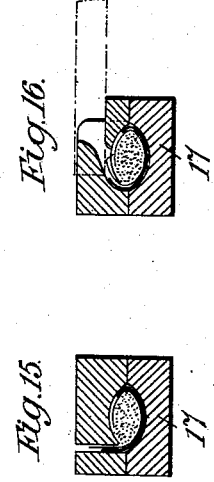
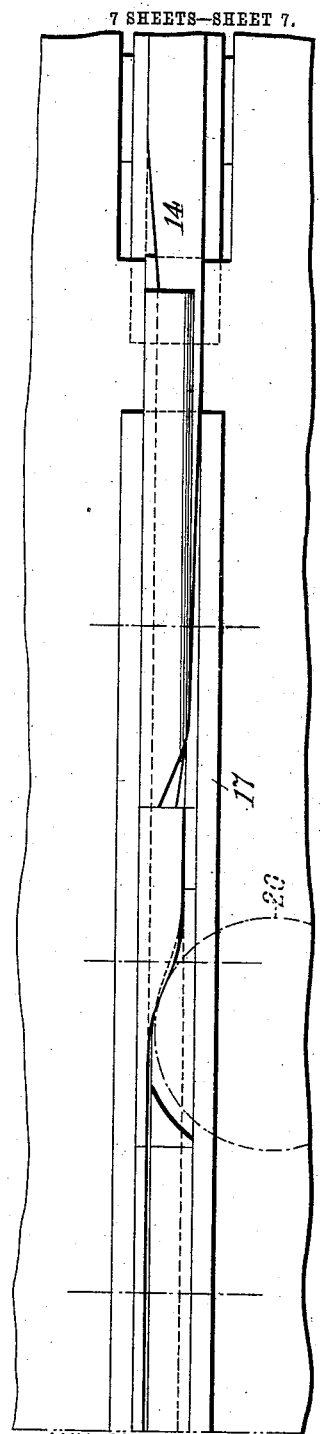
WITNESSES.
INVENTOR.
L. B. Baron
by Wilkinson & Fisher
ATTYS.

UNITED STATES PATENT OFFICE.

LOUIS BERNHARD BARON, OF LONDON, ENGLAND.

CIGARETTE-MAKING MACHINE.

SPECIFICATION forming part of Letters Patent No. 718,813, dated January 20, 1903.

Application filed March 21, 1902. Serial No. 99,282. (No model.)

*To all whom it may concern:*

Be it known that I, LOUIS BERNHARD BARON, a citizen of the United States of America, residing at London, England, have invented a certain new and useful Improved Cigarette-Making Machine, of which the following is a specification.

In what are known as "cigarette-making" machines it has heretofore been common to comb out the tobacco and supply it to an endless traveling belt, over which has been a traveling pressure-belt which formed the top of the channel and kept the tobacco down and assisted in conducting it to and through the compression-rollers, after passing through which the tobacco met the wrapping-paper usually traveling forward with a second endless belt, the paper being pasted at the edge and wrapped around the tobacco and the continuous cigarette-rod passed out through cutting mechanism which cuts the same into predetermined lengths.

The present invention relates to improvements in machines for forming a compressed continuous rod of tobacco and maintaining it in its compressed form while the paper is being wrapped and pasted about it in the usual manner.

Figure 1:
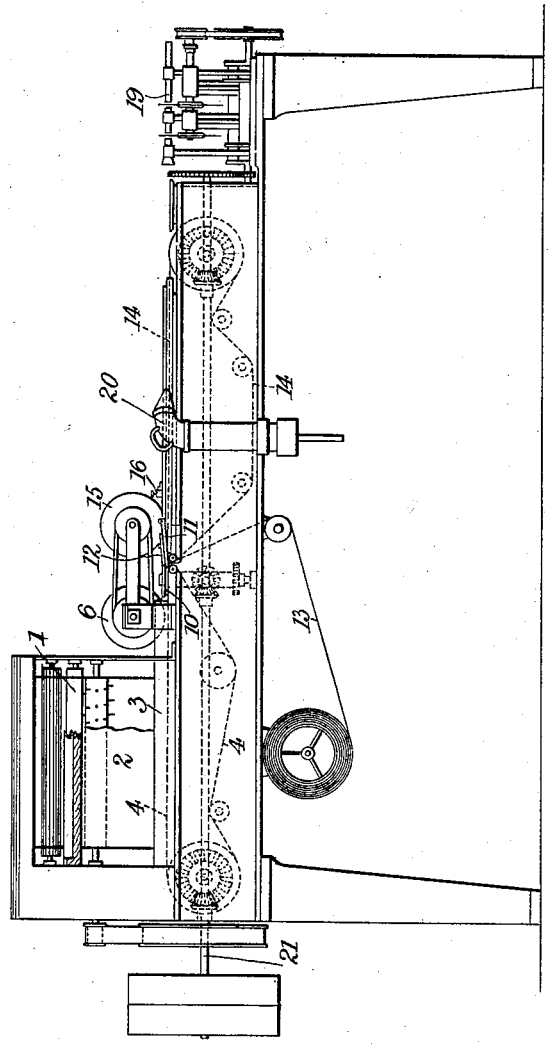
Figure 2:
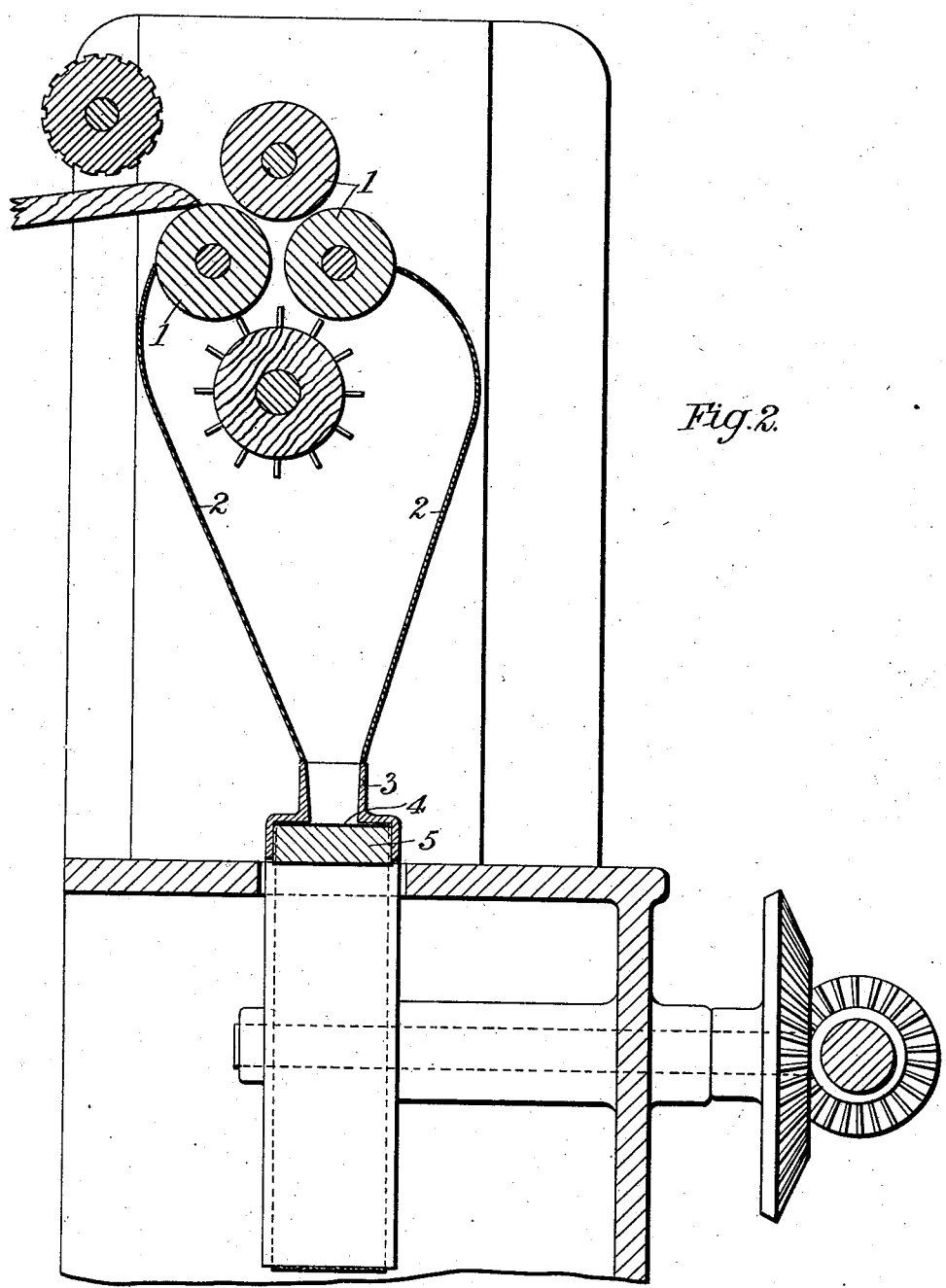
Figure 3:
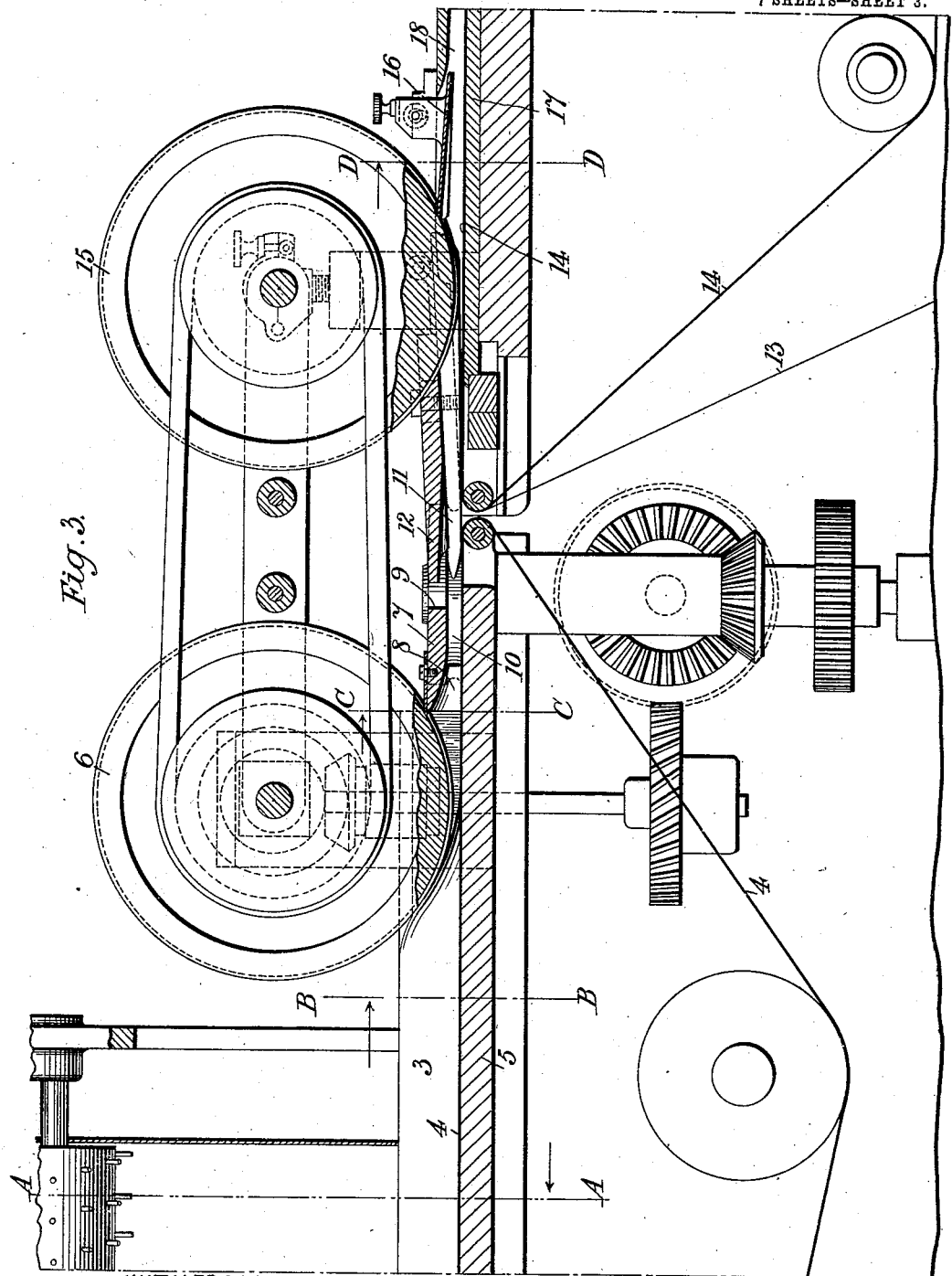
Figure 4:
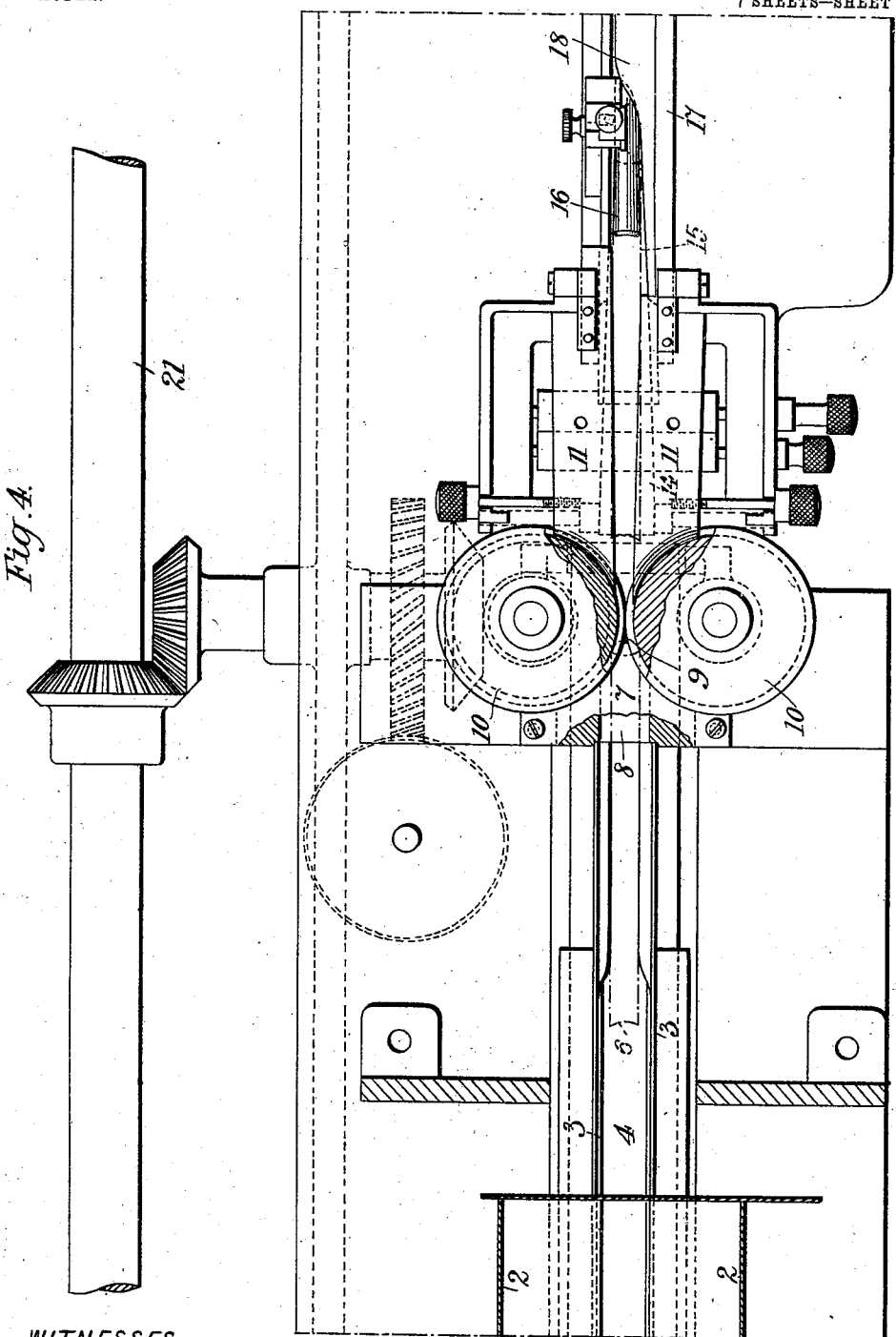
Figure 5:
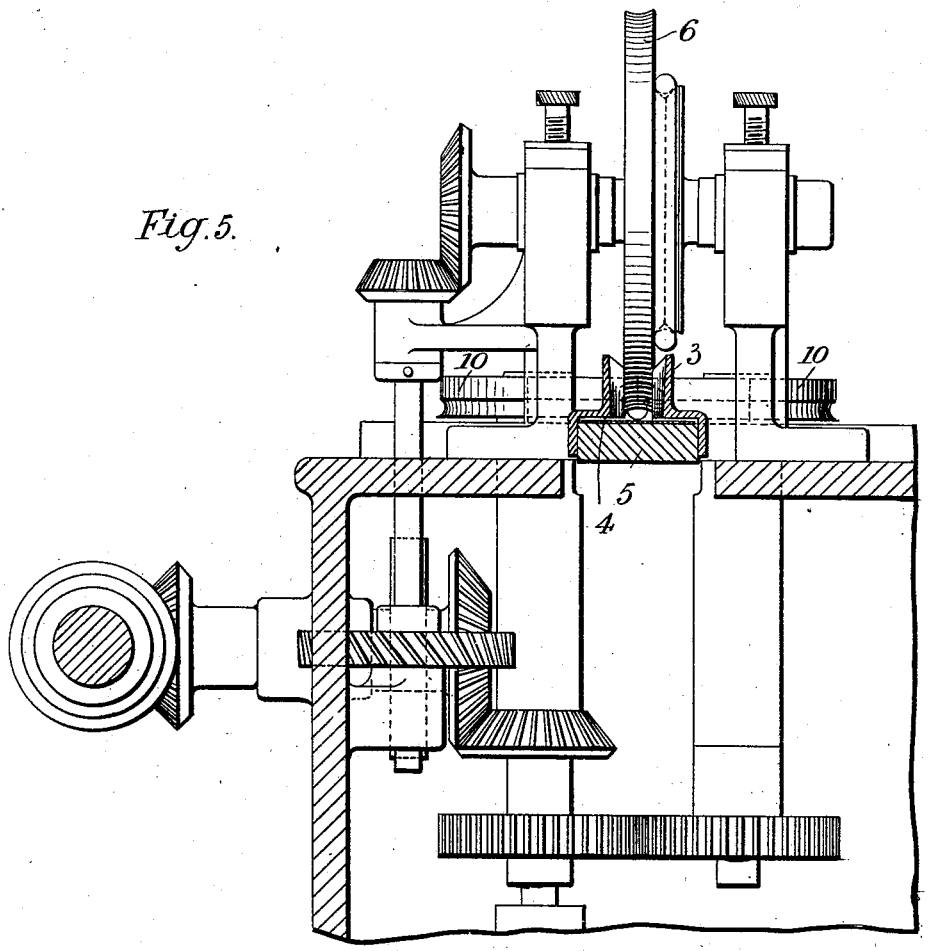

In the accompanying drawings, Figure 1 is a side elevation of a complete machine embodying many known features as well as those of the present invention, the remaining figures of the drawings being on a larger scale. Fig. 2 is a sectional elevation on the line A of Fig. 3, showing the combing mechanism and delivery-chamber to the first traveling belt. Fig. 3 is a side elevation, partly in section, of the compressing mechanism. Fig. 4 is a plan view of Fig. 3 with the vertical compressing-wheels removed. Fig. 5 is an elevation on line B of Fig. 3. Fig. 6 is an elevation of part of the mechanism shown in Fig. 5, but on a larger scale. Fig. 7 is an elevation on line C of Fig. 3, also on a larger scale. Fig. 8 is an elevation on line D of Fig. 3, also on a larger scale. Fig. 9 is a side view of the plate or trough-cover between the first vertical and the horizontal compressing-wheels. Fig. 10 is a view of the same from beneath. Fig. 11 is a side view of the second plate or trough-cover between the horizontal and the second vertical compressing-wheels. Fig. 12 is a view of the same from beneath. Fig. 13 is a side elevation in continuation of Fig. 3. Fig. 14 is a plan view of same; and Figs. 15, 16, and 17 are cross-sections, on a larger scale, on lines E, F, and G, respectively.

According to this invention the tobacco passes through the feed and comb cylinders 1 and down the closed discharge-chamber 2 to the feed-trough 3, the bottom of which is formed of the first endless belt 4, which travels over the base-plate 5. The inner faces of the trough 3 close to the first compression-wheel 6 are curved inwardly from the sides, so as to fit closely to wheel 6, the result being that as the tobacco passes under the wheel it is subjected to substantial top compression, as well as slight side compression, as will be clearly understood by reference to Figs. 4, 5, and 6. The partially compressed and formed rod of tobacco is taken from wheel 6 by trough plate or cover 7, which is provided with a downwardly-inclined opening 8, (most clearly seen in Figs. 7 and 10,) and, rearwardly a projecting piece 9, adapted to fit closely to the horizontal compression-rollers 10, the peripheries of which are in contact top and bottom, while the curved space between at the point of contact has the same cross-section as the shape of the tobacco rod it is desired to produce. This construction causes the tobacco to be first partially compressed vertically and then to be passed beneath a downwardly-inclined cover-plate, which causes further vertical compression and conducts the vertically-compressed rod to be delivered between the horizontal compression-wheels 10, which being in absolute contact above the groove formed between them prevent any relaxation of the vertical pressure, while themselves imparting the horizontal pressure necessary to complete the rod.

The tobacco rod is prevented from clinging to rolls 10 by clearing-fingers 11, (see Fig. 3,) which may be attached to the framework or to second cover-plate 12, fitting close to rollers 10 and provided with a slightly-enlarged mouth, so as to slightly relieve the pressure as the tobacco rod is passing from the first endless band 4 onto the paper 13, which is carried on the second endless band 14, the tobacco rod being immediately recompressed and formed to its proper shape by the second vertical pressure-wheel 15, from which it passes under the adjustable clearing and paper-curling tongue 16, which is most clearly seen in Figs. 3 and 8. This provision of an enlarged mouth or opening between the cover-plate 12 and the trough and at the rear of said plate, which is the exact opposite of the usual construction, is one of the special features of my machine. After the tobacco rod has been strongly compressed in a horizontal direction by the wheels 10 the sides of said rod are apt to be much more compressed than the center. The edges of the rod are thus likely to be matted together, while the central part is comparatively loose, and if this is not corrected the cigarettes made will not burn evenly. By allowing the rod to partially expand, and it will do this if the space behind the wheels 10 is great enough, this unequal compression corrects itself, so that when subsequently recompressed after it is placed upon the traveling band of paper the rod is of very nearly the same density throughout its width.

It will be noted that the bed-plate 17 is recessed, so that with pressure-wheel 15, paper-curling tongue 16, and trough-cover 18 the tobacco rod is held in its proper shape while the paper 13 is wrapped around it, pasted at the edge by mechanism 20, and again turned down and pressed thereon, as will clearly be understood by reference to Figs. 13 to 17. The wrapping of the paper, pasting its edge, and the cutting of the rod by means of cutting mechanism (indicated at 19, Fig. 1) being effected in the known manner need not be further described.

The requisite motion of the various parts may be effected from a main driving-shaft 21, operating in conjunction with the necessary counter-shafts and gear, as will be readily understood.

Having thus described my invention, what I claim as new, and desire to secure by Letters Patent, is—

1. In a cigarette-machine, the combination of a pressure-wheel adapted to partially compress the loose tobacco, a trough plate or cover adapted to take the tobacco from said wheel said plate having guide-surfaces for further reducing the bulk of the tobacco vertically and for guiding same forward and a pair of horizontal compression-wheels for the horizontal compression of the tobacco each wheel having a periphery which has a cylindrical upper part and a grooved lower part the peripheries of said wheels being in contact.

2. In a cigarette-machine, the combination of a pressure-wheel adapted to partially compress the loose tobacco, a trough plate or cover adapted to take the tobacco from said wheel said plate having guide-surfaces for further reducing the bulk of the tobacco vertically and for guiding same forward and a pair of horizontal compression-wheels for the horizontal compression of the tobacco each wheel having a periphery which has a cylindrical upper part and a grooved lower part the peripheries of said wheels being in contact, a second plate or cover which permits the compressed tobacco to expand slightly as it passes onto the wrapping-paper and a final compression-wheel adapted to finally compress and feed forward the tobacco rod.

3. In a cigarette-machine, the combination of a pressure-wheel adapted to partially compress the loose tobacco, a trough plate or cover adapted to take the tobacco from said wheel said plate having guide-surfaces for further reducing the bulk of the tobacco vertically and for guiding same forward and a pair of horizontal compression-wheels for the horizontal compression of the tobacco each wheel having a periphery which has a cylindrical upper part and a grooved lower part the peripheries of said wheels being in contact, a second plate or cover which permits the compressed tobacco to expand slightly as it passes onto the wrapping-paper and a final compression-wheel adapted to finally compress and feed forward the tobacco rod and means for wrapping and pasting paper around the completed rod.

In testimony whereof I have hereunto set my hand in the presence of two subscribing witnesses.

LOUIS BERNHARD BARON.

Witnesses:
ALLEN PARRY, Jr.,
WALTER J. SKERTEN.